United States Patent [19]

Chiao et al.

[11] 4,278,953

[45] Jul. 14, 1981

[54] NEAR MILLIMETER WAVELENGTH MODULATOR AND TUNABLE OSCILLATOR

[75] Inventors: Raymond Y. Chiao, Berkeley, Calif.; Harold R. Fetterman, Lexington, Mass.; Howard R. Schlossberg, Annandale, Va.

[73] Assignee: The United States of America as represented by the Secretary of the Air Force, Washington, D.C.

[21] Appl. No.: 23,371

[22] Filed: Mar. 23, 1979

[51] Int. Cl.³ .............................................. H01S 3/10
[52] U.S. Cl. .............................. 332/7.51; 331/94.5 C; 331/94.5 D; 307/428
[58] Field of Search .................. 332/7.51; 331/94.5 C, 331/94.5 D; 307/425, 428

[56] References Cited

U.S. PATENT DOCUMENTS

| 3,662,183 | 5/1972 | Ashkin et al. | 307/428 |
| 3,675,039 | 7/1972 | Boyd et al. | 307/428 |
| 3,789,235 | 1/1974 | Bridges et al. | 307/425 |
| 4,085,335 | 4/1978 | Guilino | 307/425 |
| 4,131,792 | 12/1978 | Schlossberg | 356/349 |

OTHER PUBLICATIONS

Fetterman et al., "Far-iR ... Diode Mixers", 7/15/78, pp. 151-154, App. Phys. Letters, vol. 33, #2, G-254.
Far et al., "Thin-Film VO$_2$ ... Polarizers", 7/1/77, pp. 11-13, App. Phys. Letters, vol. 31, #1, G-254.

*Primary Examiner*—Nelson Moskowitz
*Attorney, Agent, or Firm*—Donald J. Singer; Jacob N. Erlich

[57] ABSTRACT

A modulator and tunable oscillator capable of reliable operation in the near millimeter wavelength region. The modulator is made up of a pair of reflectors and a beamsplitter interposed therebetween with one of the reflectors having variable reflectivity. In addition, the reflectors are spaced apart a preselected distance such that a resonant condition is achieved with respect to an incoming beam of near millimeter wavelength radiation. By applying a signal to the variable reflector a beam of radiant energy is generated at a wavelength at which a non-resonant condition is achieved between the reflectors. This generated beam of radiation is directed out of the modulator by the beamsplitter. The oscillator utilizes the same elements as the modulator and in addition incorporates therein an additional beam splitter and a detector as well as a feedback circuit between the detector and variable reflector.

10 Claims, 2 Drawing Figures

NEAR MILLIMETER WAVELENGTH MODULATOR AND TUNABLE OSCILLATOR

STATEMENT OF GOVERNMENT INTEREST

The invention described herein may be manufactured and used by or for the Government for governmental purposes without the payment of any royalty thereon.

BACKGROUND OF THE INVENTION

This invention relates generally to modulators and oscillators, and, more particularly to an modulator and an oscillator capable of effective operation within the near millimeter and submillimeter wavelength region.

An ever expanding wavelength region of interest is in the short wavelength region (infrared, sub millimeter and millimeter wavelength region) such as produced by the $CO_2$ laser used in reconnaissance, communications, radar, imaging systems, pollution detection devices, frequency standards in, for example, clocks and as a tunable source in spectroscopy.

Generally, in the near millimeter or short wavelength region the modulation and/or oscillation of an electromagnetic beam of radiant energy has left much to be desired. In these wavelength regions it is extremely difficult as well as uneconomical to tune or alter the output of a laser or other electromagnetic source. Furthermore, means which could be used in addition to, for example, the laser source have been relatively complex and in most instances unsatisfactory in modulating or changing the frequency of submillimeter wavelength radiation. Consequently, with the increased applicability of the short wavelength region, it has become increasingly necessary to provide modulating and/or oscillating means which are effective in the near millimeter wavelength region.

SUMMARY OF THE INVENTION

This invention provides a near millimeter wavelength modulator and oscillator which overcomes the problems set forth in detailed hereinabove.

Making up the near millimeter wavelength modulator of this invention are a pair of optically aligned reflecting means, one being in the form of a mirror made as highly reflecting as possible over the wavelength region of the electromagnetic source (for example, near millimeter wavelengths) and a variable reflecting means which takes the form of a Schottky diode corner cube reflector assembly of the type described in an article entitled "Far-ir heterodyne radiometric measurements with quasioptical Schottky diode mixers" by H. R. Fetterman et al published in the Applied Physics Letters 33(2) July 15, 1978 by the Applied Institute of Physics, pages 151-154. Interposed between the pair of optically aligned reflecting means is a beam splitter which is made highly transmissive in the wavelength region of the source. The absorption and scattering of the beam splitter are kept much less than the transmission.

An electromagnetic radiation source, in the form of, for example, a laser provides a monochromatic beam of radiation at a preselected near millimeter wavelength. This radiation impinges upon the beam splitter and from there it is directed between the pair of reflecting means. The spacing between the reflecting means is equal to an integer number times half the wavelength of the incident radiation so that a resonant condition is achieved and none of the incident radiation passes through the beam splitter. This concept is described in a patent application entitled "Near Millimeter Wavelength Electromagnetic Filter" having the Ser. No. 960,194 and filed Nov. 13, 1978 by H. Schlossberg, a co-inventor of the instant application. By the application of a microwave signal from any suitable microwave source to the variable reflector by, for example, a conventional Klystron, a new signal having a different frequency is generated between the pair of reflecting means. This signal is at a frequency which is non resonant. It is this new signal which constitutes the output of the modulator of this invention. Any suitable detector, for example, such as another Schottky diode corner cube can be utilized to detect this output.

If the above components also include a tuned feedback circuit, that is an electrical circuit between the detector, through for example, an amplifier to the variable reflecting means the instant invention provides a tunable oscillator at any prechosen non-resonant frequency. The frequency of the oscillation would be determined by the response time of the feedback circuit.

It is therefore an object of this invention to provide a modulator capable of use in the near millimeter and submillimeter wavelength region.

It is another object of this invention to provide a tunable oscillator which can be utilized in the near millimeter and submillimeter wavelength region.

It is a further object of this invention to provide a modulator and oscillator which are economical to produce and which utilize conventional, currently available components, that lend themselves to standard mass producing manufacturing techniques.

For a better understanding of the present invention together with other and further objects thereof, reference is made to the following description taken in conjunction with the accompanying drawing and the scope will be pointed out in the appended claims.

DETAILED DESCRIPTION OF THE DRAWINGS

DETAILED DESCRIPTION OF THE PREFERRED EMBODIMENT

Figure 1:
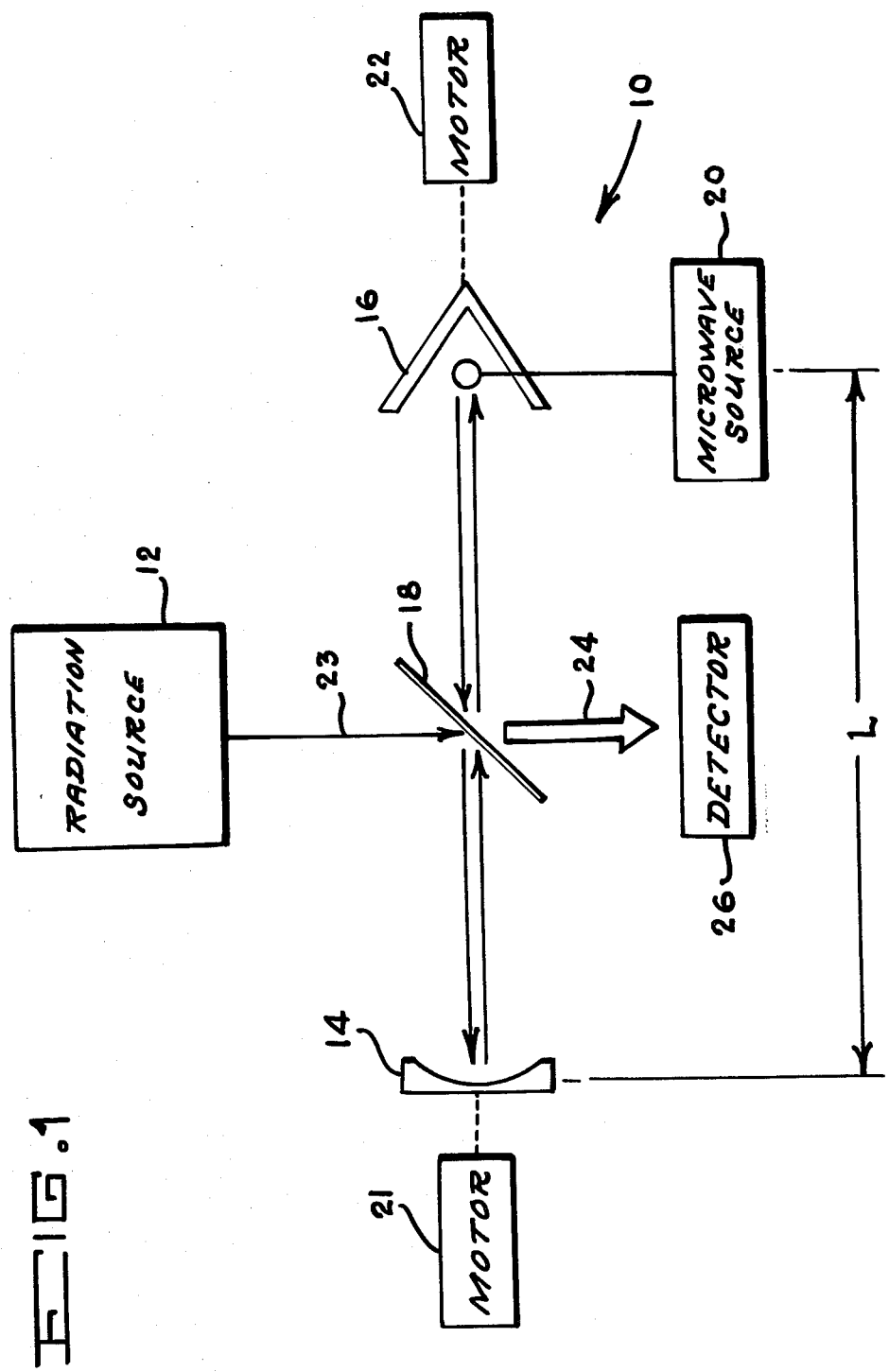
FIG. 1 is a schematic representation of the modulator of this invention.

Reference is now made to FIG. 1 of the drawing which clearly illustrates the near millimeter wavelength modulator 10 of this invention. Modulator 10 is generally utilized with any electromagnetic radiation source 12 which is, preferably, in this invention in the near millimeter or submillimeter wavelength region (100 GHz-3000 GHz). Making up the modulator 10 are a pair of reflecting elements 14 and 16 (reflecting element 16 having the capability of varying its reflectivity) and a directing element 18 in the form of a beam splitter. Reflecting element 14 and reflecting element 16 are adjustably mounted with respect to each other each having conventional moving means in the form of, for example, electric motors 21 and 22, respectively, attached thereto.

Reflecting element 14 is made, preferably of a mirror, having as highly reflecting a surface as possible in the wavelength region of the incoming beam of radiation 23 (for example, for near millimeter wavelength, the mirror 14 might be coated with evaporated silver and a very thin protective overcoating as is conventional in the art). In addition, it is unnecessary for mirror 14 to have any transmission, thereby substantially improving its overall effectiveness.

It is essential in this invention that reflecting element 16 be variably reflecting and, preferably in the form of a Schottky barrier diode corner cube assembly of the type described in a publication entitled "Far-ir heterodyne radiometric measurements with quasioptical Schottky diode mixers" by H. R. Fetterman et al in the Applied Physics Letters, 33(2), July 15, 1978 pages 151–154. In order to vary the reflectivity of element 16 any suitable microwave source such as a conventional Klystron 20 is electrically connected thereto. This source is capable of providing an additional signal into the system of this invention having a frequency of, for example, 1 GHz.

Optically interposed between reflective element 14 and variably reflective element 16 is a directing means 18, preferably in the form of a conventional beam splitter. The beam splitter 18 is situated so as to accept and direct an incoming beam of near millimeter radiation. Beam splitter 18 is generally made of a thin, low absorption dielectric material such as mylar and being highly transmissive (approximately 90%) in the wavelength region of the incoming beam of radiation 23. These conditions can be easily met by applying any suitable coating to and/or adjusting the thickness of beam splitter 18 if necessary. For proper amplification of the incoming beam of radiation 23 by the modulator 10 of this invention, the spacing L between reflective element 14 and variable reflective element 16 must be equal to an integer number times half the wavelength of the radiation of incoming beam 23. This condition is called the resonant condition. In such a condition as explained in more detail in U.S. patent application Ser. No. 960,194 entitled "Near Millimeter Wavelength Electromagnetic Filter" filed Nov. 13, 1978 by H. Schlossberg, a co-inventor of the instant application, a standing wavefield is built up between reflective element 14 and, in the case of the instant invention, variable reflective element 16 in exactly the right manner so as to destructively interfere with and cancel the radiation of the incoming beam 23 preventing its passage through beam splitter 18.

By the addition of the additional signal provided by microwave source 20 the reflectivity of variable reflector 16 is changed and a new signal is generated at a frequency which is at a non-resonant condition between reflective element 14 and variable reflector 16. It is this modulated signal 24 which is output from the modulator 10 by beam splitter 18. If desired, any suitable detector 26, such as, for example, another Schottky barrier diode corner cube assembly can be utilized to detect the output 24 of modulator 10.

An analysis of the above operation of the near millimeter wavelength modulator 10 of this invention is set forth hereinbelow:

The resonant field between the reflectors 14 and 16 can be shown, by a manner similar to that used in the prior application Ser. No. 960,194 by H. Schlossberg, to be $$E = \frac{r E_o}{1 - \rho t^2 e^{-2ikL}} \quad (1)$$

where r and t are the (complex) reflectivity and transmissivity of beam splitter 18, $\rho$ is the reflectivity of the variable reflector 16, $E_o$ is the incident field, k is the wave number of the resonant field and L is the distance between the reflectors 14 and 16. At resonance $kL = 1$, thus $$E = \frac{r}{1 - t^2 \rho} E_o \quad (2)$$

For $\rho = 1$, $$E = \frac{1}{r} E_o \quad (3)$$

since $r^2 = 1 - t^2$. Since, in this device, beam splitter 18 is chosen for low reflectivity and high transmission, equation 3 shows how the resonant field builds up to a value much larger than the incident field. It then follows from equation (2) that a small change in $\rho$, comparable only to r makes a large change in the resonant field between reflectors 14 and 16. If $\rho$ is periodically changed by a small amount a sideband frequency will be generated, and if the sideband frequency is nonresonant it will be deflected out by beamsplitter 18.

Typically for a Schottky diode assembly the reflection coefficient $$\rho = \frac{Z_o - R(V) + i Y_t}{Z_o + R(V) + i Y_t}$$

where $z_o$ is a characteristic impedance and R(V) is the real resistance of diode assembly 16 as a function of applied voltage V on the diode assembly 16 and $V_t$ is the reactive component of the impedance of diode assembly 16.

Setting $V = V_{Bias} = V_m \cos \omega_m t$ on the diode assembly 16 will generate sidebands at $\omega_m$ in the transmitted power.

Figure 2:
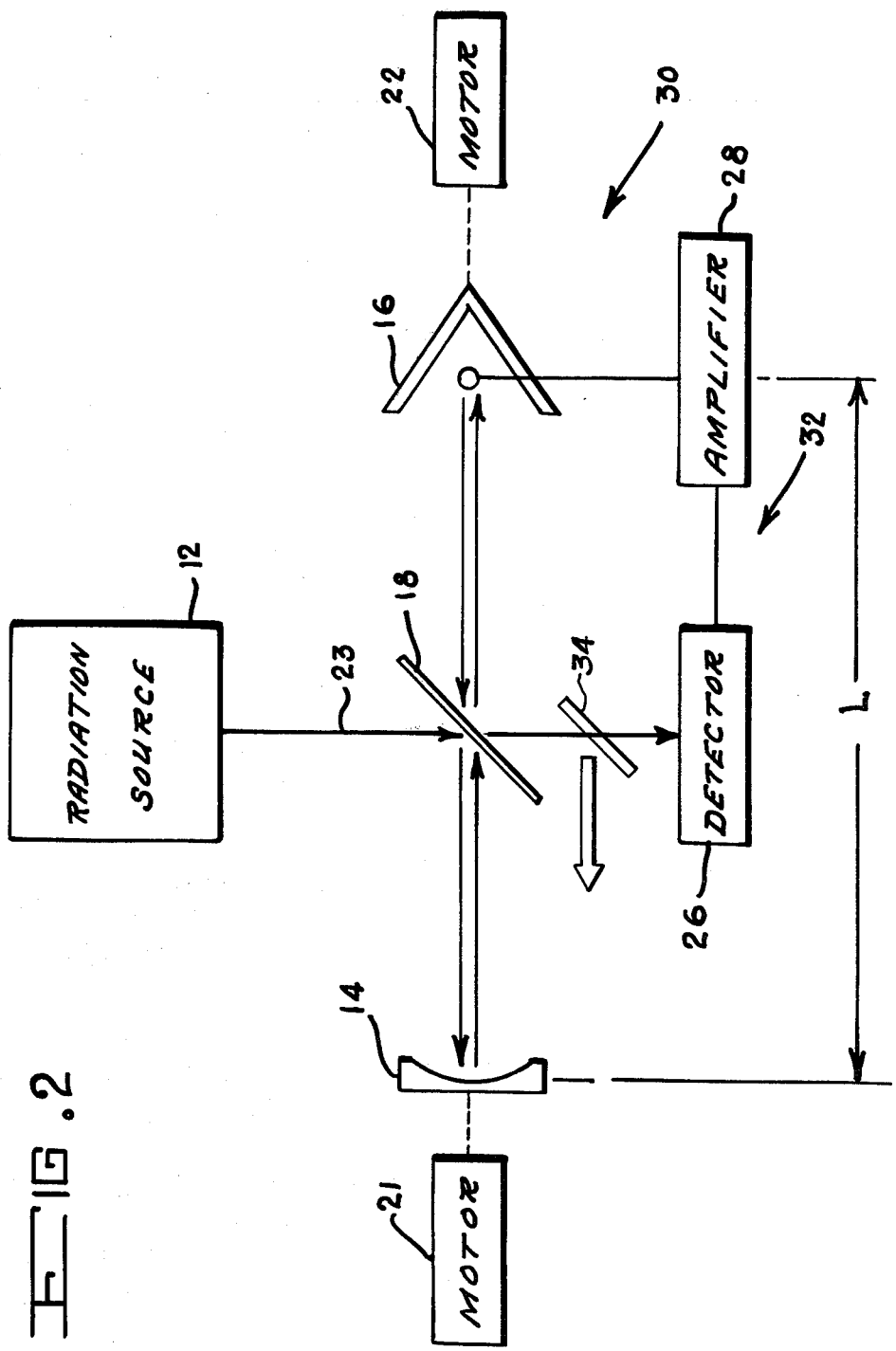
FIG. 2 is a schematic representation of the tunable oscillator of this invention.

Reference is now made to FIG. 2 of the drawing which shows in detail the near millimeter wavelength tunable oscillator 30 of the instant invention. Detection of the transmitted power and converting it into a feedback voltage so that the resistance of the Schottky diode assembly 16 is a function of the transmitted power will make the system of this invention into oscillator 30. This will have certain advantages over an open loop modulator. For example, FM noise on the incident beam 23 is eliminated due to the feedback, whereas in a modulator without feedback, any noise on the incident signal and the modulation signal are transferred to the generated non-resonant output signal.

Oscillator 30 of this invention is made up of the identical elements set forth with respect to modulator 10 and shown in FIG. 1 of the drawing with the addition of a feedback circuit 32 and an additional beam splitter 34. Therefore, for simplicity, identical elements utilized with oscillator 30 of this invention will be identically numbered to those elements found with respect to modulator 10 shown in FIG. 1 of the drawing.

The feedback circuit 32 is electrically connected between detector 26 and variable reflective element 16 by way of, if necessary, a conventional amplifier 28. With the addition of feedback circuit 32, a tunable oscillator 30 at any prechosen non-resonant frequency is provided. The frequency of oscillator 30 is determined by the response time of feedback circuit 32. The output of oscillator 30 is directed from oscillator 30 by way of beam splitter 34 which is optically interposed between beam splitter 18 and detector 26. Although this invention has been described with reference to particular embodiments, it will be understood to those skilled in the art that this invention is also capable of further and other embodiments within the spirit and scope of the appended claims.

We claim:

1. A near millimeter wavelength modulator which is operable with an incoming beam of monochromatic radiation of preselected near millimeter wavelength comprising means for reflecting said beam of radiation, means in optical alignment with said reflecting means for variably reflecting said beam of radiation, said reflecting means and said variable reflecting means being spaced a preselected distance apart, said distance between said reflecting means and said variable reflecting means being such that a resonant condition is achieved with respect to said incoming beam of radiation, means operably connected to said variable reflecting means for varying the reflectivity thereof in order to generate a beam of radiation at a wavelength at which a non-resonant condition is achieved between said reflecting means and said variable reflecting means and means in optical alignment with said reflecting means and said variable reflecting means for receiving said incoming beam of preselected monochromatic radiation, directing said incoming beam of radiation between said reflecting means and said variable reflecting means and for directing said generated beam of radiation at said wavelength at which said non-resonant condition is achieved out of said modulator.

2. A near millimeter wavelength modulator as defined in claim 1 wherein said variable reflecting means is in the form of a Schottky barrier diode corner cube assembly.

3. A near millimeter wavelength modulator as defined in claim 2 wherein said reflecting means is in the form of a highly reflective mirror.

4. A near millimeter wavelength modulator as defined in claim 3 wherein the distance between said reflecting means and said variable reflecting means is adjustable.

5. A near millimeter wavelength modulator as defined in claim 1 wherein said means for varying the reflectivity of said variable reflector is in the form of a microwave source.

6. A near millimeter wavelength tunable oscillator which is operable with an incoming beam of monochromatic radiation of preselected near millimeter wavelength comprising means for reflecting said beam of radiation, means in optical alignment with said reflecting means for variably reflecting said beam of radiation, said reflecting means and said variable reflecting means being spaced a preselected distance apart, said distance between said reflecting means and said variable reflecting means being such that a resonant condition is achieved with respect to said incoming beam of radiation, means in optical alignment with said reflecting means and said variable reflecting means for receiving said incoming beam of preselected monochromatic radiation, directing said incoming beam of radiation between said reflecting means and said variable reflecting means and for directing a beam of radiation therefrom, means for detecting said beam of radiation directed from said receiving and directing means, means operably connected between said detecting means and said variable reflecting means for varying the reflectivity of said variable reflecting means in order to generate a beam of radiation at a wavelength at which a non-resonant condition is achieved between said reflecting means and said variable reflecting means and means in optical alignment with said receiving and directing means for directing said generated beam of radiation at a wavelength at which said non-resonant condition is achieved out of said oscillator.

7. A near millimeter wavelength tunable oscillator as defined in claim 6 wherein said means operably connected between said detecting means and said variable reflecting means is in the form of a tuned feedback circuit.

8. A near millimeter wavelength tunable oscillator as defined in claim 7 wherein said variable reflecting means is in the form of a Schottky barrier diode corner cube assembly.

9. A near millimeter wavelength tunable oscillator as defined in claim 8 wherein said reflecting means is in the form of a highly reflective mirror.

10. A near millimeter wavelength tunable oscillator as defined in claim 9 wherein the distance between said reflecting means and said variable reflecting means is adjustable.

* * * * *